United States Patent
Schoggen

[15] 3,678,031
[45] July 18, 1972

[54] SLURRY PROCESS FOR THE PRODUCTION OF ABSORPTIVE CARBOXY METHYL CELLULOSE FIBERS

[72] Inventor: Howard L. Schoggen, Memphis, Tenn.
[73] Assignee: The Buckeye Cellulose Corporation, Cincinnati, Ohio
[22] Filed: Oct. 21, 1970
[21] Appl. No.: 82,797

[52] U.S. Cl. .................................... 260/231 CM, 260/232
[51] Int. Cl. .................................................. C08b 11/00
[58] Field of Search ............. 260/231 CM, 232; 106/197 CM

[56] References Cited

UNITED STATES PATENTS

| | | |
|---|---|---|
| 2,517,577 | 8/1950 | Klug et al. ........................... 260/231 |
| 2,639,281 | 5/1953 | Hodge et al. ........................ 260/231 |
| 2,772,999 | 12/1956 | Masci et al. ........................ 260/231 |
| 2,816,889 | 12/1957 | Brannan ............................. 260/231 |
| 3,347,855 | 10/1967 | Nelson ............................... 260/231 |

*Primary Examiner*—Donald E. Czaja
*Assistant Examiner*—Ronald W. Griffin
*Attorney*—William S. Shelow, III and Richard C. Witte

[57] ABSTRACT

Alkali metal salts of carboxymethyl cellulose are prepared by producing and then etherifying alkali cellulose under conditions selected to result in a molar excess of neutralized acidic etherifying reagent to moles of unreacted neutralizing reagent together with extended etherifying time and temperature conditions, i.e., about 3 to about 24 hours at about 60°C. to about 80°C. to yield substantially insoluble acidic products, which products are white in color, have a reflectance brightness of about 70 to about 80, have a normally soluble degree of substitution range of about 0.4 to 1.2 and are absorptive and retentive of up to about 70 times their weight of aqueous solutions.

6 Claims, No Drawings

SLURRY PROCESS FOR THE PRODUCTION OF ABSORPTIVE CARBOXY METHYL CELLULOSE FIBERS

BACKGROUND OF THE INVENTION

This invention relates to the production of alkali metal salts of carboxymethyl cellulose and other water soluble cellulose derivatives containing carboxyl and hydroxyl groups, referred to herein as carboxymethyl cellulose, by slurry processes wherein alkali cellulose is prepared and then contacted with etherifying reagents while slurried in an inert organic reaction diluent.

More particularly, the invention provides a slurry process for the production of substantially water insoluble, i.e. less than 35 percent water soluble, carboxymethyl celluloses having a degree of substitution (d.s.) believed heretofore to result in water solubility.

Specifically, the invention comprises a slurry process for the production of substantially water insoluble carboxymethyl cellulose products which exhibit a high reflectance brightness together with enhanced absorption and retention of aqueous solutions.

The invention relates to slurry processes for the production of carboxymethyl cellulose such as those disclosed in U.S. Pat. No. 2,517,577, issued to Eugene D. Klug et al. on Aug. 8, 1950, and U.S. Pat. No. 3,347,855, issued to Russell Nelson on Oct. 17, 1967.

The invention also relates to methods of insolubilizing previously prepared water soluble carboxymethyl celluloses such as are described in U.S. Pat. No. 2,682,481 and U.S. Pat. No. 2,682,482, issued to William B. Hewson on June 29, 1954, U.S. Pat. No. 2,270,200, issued to Richard M. Upright on Jan. 13, 1942, and U.S. Pat. No. 2,639,239, issued to Edwin S. Elliott on May 19, 1953.

The invention further relates to water soluble carboxymethyl celluloses which can subsequently be insolubilized merely by heat curing as disclosed in U.S. Pat. No. 3,379,720, issued to Albert R. Reid on Apr. 23, 1968.

The present invention is directed to the clear desirability of producing directly in a slurry process an absorptive and retentive and substantially water insoluble carboxymethyl cellulose for use in absorptive structures of a personal use nature such as tampons, catamenial napkins, diapers, surgical dressings and the like. It is highly desirable to eliminate both the additional step involved in insolubilizing previously prepared water soluble carboxymethyl cellulose and to avoid the product coloration engendered by post preparation heat treatments.

It is an object of this invention to provide a process for producing substantially insoluble, highly absorptive and retentive carboxymethyl cellulose in fiber, comminuted and powder forms, which carboxymethyl cellulose has a d.s., of at least about 0.4, in the normally water soluble range.

It is a further object of this invention to provide substantially water insoluble, highly absorptive and retentive carboxymethyl cellulose fibers and powders which are suitable for use in personal use fibrous structures due to their white color.

SUMMARY OF THE INVENTION

The above objects and other objects which will hereinafter become apparent can be achieved by etherifying alkali cellulose in a slurry process stage wherein (1) the amount of carboxyl group containing acid etherifying agent, such as monochloroacetic acid, and the amount of neutralizing agent therefor, such as alkali metal hydroxide, present is selected and regulated so that a molar excess of sodium chloroacetate respective to moles of unreacted neutralizing agent, i.e. alkali metal hydroxide, exists at a level of unreacted neutralizing agent sufficiently high to result in a carboxymethyl cellulose product with a d.s. of about 0.4 to about 1.2 and (2) the combined time and temperature conditions in the etherifying reaction shall be sufficient to result in a substantial insolubilization of the resulting carboxymethyl cellulose product.

DESCRIPTION OF THE PREFERRED EMBODIMENTS

In carrying out a slurry process for the production of a substantially water insoluble carboxymethyl cellulose exhibiting increased absorptive and retentive capacity together with enhanced brightness, cellulose is slurried in an aqueous solution of an inert organic diluent. The cellulose can be in either fibrous, comminuted or powder form, and suitable inert organic diluents for use in the present process are isopropanol, acetone and isobutanol. The slurried cellulose is contacted in a first step with a water soluble alkali metal hydroxide. Suitable alkali metal hydroxides are sodium hydroxide and potassium hydroxide. The resulting alkali cellulose is contacted with an etherifying agent supplying a carboxyl radical; a suitable etherifying agent is monochloroacetic acid. The alkali cellulose is etherified to a d.s. which normally affords water solubility, i.e. a d.s. of about 0.4 to about 1.2.

While still slurried in the aqueous solution of alkali metal hydroxide and etherifying agent in the inert organic diluent, with isopropanol being preferred, there is maintained in said slurry a total liquid-to-cellulose ratio of about 15 to about 40 to 1, preferably about 25 to about 40 to 1, with 30 to 1 being considered an optimum.

Further, the cellulose and the alkali cellulose in said steps is contacted with about 1.1 to about 1.9, preferably about 1.5 moles of a water soluble alkali metal hydroxide per mole of monochloroacetic acid and there are used in the reaction about 0.4 moles to about 8 moles, preferably about 2 moles of monochloroacetic acid per mole of anhydroglucose unit of cellulose, while insuring a mole ratio of sodium hydroxide to anhydroglucose unit of cellulose after neutralization of at least 0.5 to insure a d.s. of at least 0.4 and to result in a slightly acid product.

Also, in said slurry there are maintained as liquid ratios in said steps a water-to-cellulose ratio of about 3 to about 7 to 1, preferably about 3.3 to 1 and an inert organic diluent-to-water ratio of about 4 to about 10 to 1, preferably about 8 to 1, while contacting the slurried cellulose with the water soluble alkali metal hydroxide at a slurry temperature of about 0°C. to about 20°C., preferably about 5°C. to about 20°C. for a period of about 0.1 to about 1 hour, preferably about 0.2 to about 0.6 hour.

The alkali cellulose produced is thereafter contacted with the monochloroacetic etherifying agent, in the amounts above prescribed, at a slurry temperature of about 60°C. to about 80°C., with 80°C. being considered an optimum, for a period of about 3 hours to about 24 hours, preferably about 3 hours to about 12 hours, with an optimum being considered about 3 hours. The times and temperatures for etherifying reaction are selected within the specified ranges to result in a substantially water insoluble alkali metal salt of carboxymethyl cellulose exhibiting a d.s. of about 0.4 to about 1.2 together with water solubilities of less than 35 percent by weight. The times and temperatures required are inversely selected so that lower temperatures require longer times, while at higher temperatures substantial insolubilization can be effected at decreased times. The resulting water insoluble carboxymethyl cellulose products exhibit water retention values of about 1,000 to about 7,000 together with salt retention values of about 400 to about 2500.

As stated previously, the moles of the neutralized etherifying agent, i.e. sodium chloroacetate, must exceed the moles of caustic present after neutralization. Also, there must be a sufficient number of moles of caustic present per mole of anhydroglucose unit of cellulose after neutralization to insure the attainment of a normally soluble d.s. of about 0.4 or above. To insure this level of d.s. there must be at least 0.5 moles of caustic per mole of anhydroglucose unit in cellulose present after neutralization of the acidic etherifying agent.

In relation to the moles of sodium hydroxide present per mole of anhydroglucose unit in cellulose in the reaction, it has previously been stated that there must be an excess of the neutralized etherifying agent, sodium monochloroacetate. In this regard, as the excess of etherifying agent increases, the time for insolubilization of the product to be affected is reduced, and up to 8 moles of monochloroacetic acid etherifying agent per mole of anhydroglucose unit of cellulose can be employed. Additional amounts of etherifying agents of up to 12 moles of monochloroacetic acid per mole of anhydroglucose unit in cellulose cellulose will result in the products of this invention; however, no beneficial effect has been noted in the reaction or product and such additional excess usage results in purification problems attendant to the removal of extra salts from the product requiring extra solvent and water. Hereinafter in this application reference to mole of cellulose will be understood to refer to mole of anhydroglucose unit in cellulose at a molecular weight of 162 in order to recite the definite molecular weight rather than a molecular weight range of cellulosic chains at 100,000 to 500,000 for the purpose of stoichiometric calculations as conventionally practiced and understood by cellulose chemists.

As previously stated, the final condition of the etherifying step must be that which is engendered by an excess of neutralized etherifying acid; however, the essential acid balance of the etherifying reaction can be engendered by the addition of amounts of hydrochloric acid and other suitable inorganic acids with the provision that otherwise sufficient amounts of alkali metal hydroxide and etherifying agent are present to insure the attainment of a normally soluble d.s.

In stating the time and temperature conditions required in the etherifying reaction to insure insolubilization of the final product together with the enhanced absorption and retention characteristics which are characteristic of products of this invention, certain guidelines are noted in that with slight molar excesses of acid to alkali metal hydroxide, such as a 1.1 mole excess, the following time temperature ratios exist; for example, equivalent products are produced at 60°C. and about 10 hours; at 80°C. the time requirement is reduced to about 3 hours. At higher and lower temperatures it is expected that inversely related shorter and longer times would result in insolubilization and the attainment of equal Water Retention Values (WRV's) and Salt Water Retention Values (SRV's). In this same respect, an increase in the excess moles of acid to moles of unreacted sodium hydroxide up to 1.5 and higher will result in a progressive reduction of time to achieve the same or increased degrees of insolubilization.

With regard to the stated advantages in brightness for substantially water insoluble absorptive carboxymethyl cellulose products made by the process of this invention, these products are characterized by having reflectance brightness values of about 75 to about 80 and are like those brightness values exhibited by conventional slurry carboxymethyl cellulose products. In this respect, the present products are not reduced in brightness as are carboxymethyl celluloses made substantially water insoluble by post curing and insolubilization treatments engendered by elevated temperatures.

It is noted that engendering the requisite water insolubility of the product during the etherifying reaction the acidic conditions can be affected in several different ways. In this respect, it is only critical that an acidic condition be engendered in etherification, i.e. that there be an excess of the moles of neutralizing etherifying agent over the unreacted moles of alkali metal hydroxide for a sufficient period at the end of the etherifying reaction to affect insolubility in the carboxymethyl cellulose having a normally water soluble d.s. Providing that a sufficient number of moles of monochloroacetic acid and moles of alkali metal hydroxide are present during etherification to insure a water soluble d.s., the required acidity can be engendered by the addition of an amount of hydrochloric or nitric acid in excess of that necessary to provide a ratio in excess of 1 between the moles of neutralized etherifying agent, i.e. sodium monochloroacetate, and moles of remaining alkali metal hydroxide. Also, the acid excess can be provided by addition of sodium monochloroacetate itself to the etherifying reaction at a time and temperature sufficiently prior to the completion of reaction to insure insolubility. Further, the excess of neutralized etherifying agent, i.e. sodium monochloroacetate can be provided in company with lesser amounts of hydrochloric or other suitable inorganic acids to insure acidity in the reaction. The presence of neutralized salts over and above the required molar ratios of sodium monochloroacetate and sodium hydroxide are deemed immaterial to successful completion of the process.

In determining the properties of the water insoluble absorptive and retentive fibers produced by the process of this invention, several test procedures were employed including a determination of the d.s., which determination was made by the method published in Svensk Papperstidning 63 (1960), pp. 714–715 by Karin Wilson as modified by the use of methyl alcohol instead of ethyl alcohol.

The WRV's reported herein were determined by a procedure in which samples of the carboxymethyl cellulose weighing from about 0.05 grams to about 0.3 grams are soaked in 100 milliliters of water in a covered container for at least 16 hours at room temperature. In this procedure for the determination of absorbency, subsequent to the soaking period, the soaked fibers are collected on a filter, lightly squeezed and then transferred to 80-mesh screen baskets which are supported 1½ inches above the bottom of metal centrifuge tubes. The tubes are covered with plastic covers, and the samples are centrifuged at a relative centrifugal force of 1,500 to 1,700 gravities for 20 minutes. The centrifuged samples are removed rapidly from the screens by means of tweezers to tared weighing bottles and then weighed. The weighed samples are then dried to constant weight at 110°C. and reweighed.

The WRV is calculated as follows:

$$WRV = W - D/D \times 100$$

Where
W = sample wet weight
D = sample dry weight
W − D = weight of absorbed water The procedure used for the determination of the SRV's reported herein was the same as the method described above for use in the determination of WRV's, with the exceptions that aqueous sodium chloride solution containing 1% by weight of sodium chloride was used in the procedure instead of water, and the calculation, given below, corrects for the sodium chloride remaining on the dried fibers. The calculation is as follows:

$$SRV = \frac{\text{wt. salt solution retained}}{\text{dry wt. fibers (salt free)}} \times 100$$

$$SRV = \frac{(W-D)\frac{100}{99}}{\frac{(W-D)}{99}} \times 100$$

Where
W = sample wet weight
D = sample dry weight
W − D = weight of absorbed salt solution pH is measured on the substantially insoluble products by measuring the pH of a 1% by weight aqueous slurry of the product. The procedure used for determining the solubility in water employs a 0.2–0.3 gram sample of the product to be tested. The weighed sample is washed into a beaker and soaked for an extended period (overnight) in 100 milliliters of deionized water. The soaked fibers are then collected on a tared crucible, washed with methanol, dried at 110°C., and weighed. The calculation used to obtain the solubility is as follows:

$$\% \text{ soluble} = 100 - \left[ \frac{\text{g. of residue}}{\text{g. of sample} \left[ \frac{100 - \% H_2O}{100} \right]} \times 100 \right]$$

Where % $H_2O$ = moisture of original sample

The reflectance (brightness) values referred to above and set forth in the Examples below are reflectances measured by a Beckman Model Du Spectrophotometer, Ser. No. 73724 from the surface of an opaque pad of the product fibers using a wavelength of 457 mmu. with a National Bureau of Standards No. 215.505L standard reflectance tile for comparison.

Having described embodiments of the process and product of the present invention, the following examples illustrate specific embodiments and variations thereof together with illustrations showing the effect of operating outside the disclosed limits. The examples, while illustrating variations in operation are not intended to limit the scope of the present invention more than is required by the appended claims.

EXAMPLE I

Eighty grams of sheeted cellulose pulp was disintegrated in aqueous isopropanol with vigorous agitation, and 65.9 grams of sodium hydroxide, per se, was added in an aqueous solution having a concentration of 50 percent by weight. The amount of isopropanol and water was adjusted so that the total diluent to cellulose ratio by weight, including the water accompanying the sodium hydroxide, was 30 to 1 while the water to cellulose ratio, by weight, was 3.33 to 1; consequently, the alcohol to water ratio was 8 to 1 by weight. Included in the above amounts, about 1 part of water per part of cellulose was used to improve the disintegration of the fibers in the diluent by direct addition to the dry cellulose. After contacting the slurried cellulose with the sodium hydroxide for 30 minutes at 20°–25C., 103.2 grams of monochloroacetic acid was added while agitation was continued. At this time the total sodium hydroxide present was in the ratio of 1.5 moles of sodium hydroxide per mole of monochloroacetic acid, and the monochloroacetic acid present was in the ratio of 2.2 moles per mole of cellulose, while the excess of monochloroacetic acid was 1.1 moles per mole cellulose. The temperature of the reaction vessel was increased to 60°C. and the reaction allowed to proceed for the periods specified below. At the end of the specified reaction period the product was filtered and purified by washing with methanol and air dried. The products at different reaction times had the following properties:

| Reaction Time | d.s. | pH | SRV | WRV | % Sol. |
|---|---|---|---|---|---|
| (Hrs.) | | | | | |
| 6 | .92 | 6.9 | — | — | Soluble |
| 8 | .93 | 6.7 | — | — | Soluble |
| 10 | .87 | 6.8 | 1848 | 7721 | 36.8 |
| 12 | .67 | 6.8 | 1344 | 3942 | 31.0 |
| 14 | .83 | 6.7 | 1576 | 5425 | 33.0 |
| 24 | .89 | 6.6 | 1136 | 2236 | 22.2 |

The products of this Example I from etherification reactions at 10, 12, 14 and 24 hours all show WRV's and SRV's indicative of their high absorption and retention properties making them suitable for use in absorptive structures. The soluble illustration samples taken at 6 and 8 hours do not exhibit WRV and SRV values and are included for comparison with products of the present invention.

EXAMPLE II

The quantities of cellulose, alcohol, water, sodium hydroxide and monochloroacetic acid and procedure are the same in this Example II as in Example I, but the temperature was increased to 70°C. instead of 60°C. The products thus produced had the following properties:

| Reaction Time | d.s. | pH | SRV | WRV | % Sol. |
|---|---|---|---|---|---|
| (Hrs.) | | | | | |
| 3 | .54 | 7.0 | — | — | Soluble |
| 5 | .79 | 6.5 | 1296 | 3791 | 22.5 |
| 7 | .91 | 6.5 | 1231 | 2565 | 20.7 |
| 9 | .90 | 6.6 | 1055 | 1940 | 16.0 |
| 11 | .79 | 6.6 | 850 | 1596 | 14.9 |
| 13 | .87 | 6.5 | 986 | 2631 | 16.9 |

It is noted that at 70°C., the products at 5, 7, 9, 11 and 13 hours are all useful products of the present invention suited to use in absorptive structures. The soluble illustration sample was taken at 3 hours to show that, at 3 hours and 70°C. products of the present invention are not produced under the conditions of Example II.

EXAMPLE III

The quantity of cellulose, alcohol, water, sodium hydroxide and monochloroacetic acid was the same as in Example I, but the temperature was increased to 80°C. instead of 60°C. The product thus produced had the following properties:

| Reaction Time | d.s. | pH | SRV | WRV | % Sol. | Reflectance |
|---|---|---|---|---|---|---|
| (Hrs.) | | | | | | |
| 1 | .76 | 7.9 | — | — | Soluble | — |
| 3 | .90 | 6.7 | 1503 | 3714 | 25.4 | 75 |
| 5 | .92 | 6.9 | 1045 | 1788 | 17.7 | 75 |
| 7 | .72 | 6.4 | 844 | 1345 | 15.7 | 76 |
| 9 | .92 | 6.0 | 838 | 1242 | 13.5 | 73 |
| 11 | .93 | 6.4 | 790 | 1021 | 9.4 | 71 |

The reflectance brightness of the products of this Example III taken at 3, 5, 7, 9 and 11 hours are tabulated together with their WRV's and SRV's and pH's, illustrating them as products of the present invention and as suitable for use in absorptive structures. The sample taken at 1 hour is included to illustrate that at the 80°C. temperature and conditions of Example III a substantially insoluble product with a WRV and a SRV is not produced.

EXAMPLES IV – XV

The quantity of sodium hydroxide and monochloroacetic acid per mole or cellulose in these Examples IV – XV was kept at the ratios set forth in Example I, but the cellulose, isopropanol and water present was adjusted so that the ratios by weight tabulated below were realized. The product properties for a 24-hour reaction at 80°C. are specified.

| Example | Total diluent/cell ratio | Alc/H$_2$O ratio | H$_2$O/cell ratio | d.s. | pH | SRV | WRV | % Sol. |
|---|---|---|---|---|---|---|---|---|
| IV | 25 | 10 | 2.3 | .62 | 5.8 | 594 | 849 | 13.7 |
| V | 25 | 8 | 2.8 | .89 | 5.8 | 819 | 2788 | 11.4 |
| VI | 25 | 6 | 3.6 | .79 | 5.8 | 828 | 1418 | 18.1 |
| VII | 25 | 4 | 5.0 | .71 | 5.8 | 765 | 1651 | 23.1 |
| VIII | 30 | 10 | 2.6 | .94 | 6.0 | 910 | 5899 | 15.4 |
| IX | 30 | 8 | 3.3 | .83 | 6.2 | 643 | 982 | 12.5 |
| X | 30 | 6 | 4.3 | .87 | 6.0 | 880 | 941 | 18.8 |
| XI | 30 | 4 | 6.0 | .74 | 5.9 | 900 | 1428 | 21.2 |
| XII | 40 | 10 | 3.6 | 1.04 | 6.1 | 871 | 2295 | 30.8 |
| XIII | 40 | 8 | 4.5 | .97 | 6.1 | 885 | 1221 | 17.3 |
| XIV | 40 | 6 | 5.7 | .90 | 6.1 | 920 | 7484 | 20.5 |
| XV | 40 | 4 | 8.0 | 1.13 | 6.0 | 872 | 2037 | 29.7 |

The products of Examples IV – XV are all shown to be highly absorptive.

EXAMPLES XIV – XXXIV

The quantity of cellulose, isopropanol and water in these Examples XIV–XXXIV was kept at the ratios as for Example I, but the quantities of sodium hydroxide and monochloroacetic acid were varied so that the mole ratios were obtained as given in the following table. The product properties for a 24-hour reaction at 80°C. are specified in the table.

| Example | moles MCA /cell | moles NaOH /MCA | d.s. | pH | SRV | WRV | %Sol. |
|---|---|---|---|---|---|---|---|
| XVI | 2.2 | 1.27 | 0.51 | 6.1 | 493 | 725 | 9.5 |
| XVII | 2.2 | 1.32 | 0.65 | 5.9 | 574 | 807 | 9.8 |
| XVIII | 2.2 | 1.36 | 0.66 | 6.0 | 616 | 904 | 10.1 |
| XIX | 2.2 | 1.41 | 0.66 | 6.0 | 573 | 835 | 11.4 |
| XX | 2.2 | 1.46 | 0.49 | 6.0 | 468 | 717 | 15.7 |
| XXI | 2.2 | 1.51 | 0.64 | 6.0 | 768 | 1443 | 18.8 |
| XXII | 2.2 | 1.54 | 0.92 | 6.0 | 937 | 1453 | 21.8 |
| XXIII | 2.2 | 1.59 | 1.01 | 5.8 | 1035 | 1893 | |
| XXIV | 2.2 | 1.63 | 1.08 | 5.9 | 1180 | 2056 | 29.0 |
| XXV | 2.2 | 1.68 | 1.12 | 6.0 | 1368 | 3211 | 30.5 |
| XXVI | 2.2 | 1.73 | 0.84 | 5.8 | 1741 | 4383 | 33.3 |
| XXVII | 2.2 | 1.77 | 1.15 | 6.0 | 2118 | 5936 | 39.4 |
| Illustration I | 2.2 | 2.04 | 1.12 | 7.8 | — | — | soluble |
| XXVIII | 2.1 | 1.53 | 0.61 | 6.1 | 735 | 990 | 16.2 |
| XIX | 2.0 | 1.55 | 0.72 | 6.1 | 705 | 1177 | 17.5 |
| XXX | 1.9 | 1.58 | 0.81 | 6.0 | 819 | 1332 | 18.2 |
| XXXI | 1.8 | 1.61 | 0.69 | 6.0 | 775 | 1244 | 20.4 |
| XXXII | 1.6 | 1.69 | 0.87 | 6.1 | 907 | 1717 | 20.4 |
| XXXIII | 1.4 | 1.79 | 0.77 | 6.3 | 1050 | 1031 | 25.7 |
| XXXIV | 1.2 | 1.92 | 0.90 | 5.9 | 2514 | 2501 | 42.2 |
| Illustration II | 1.0 | 2.10 | 0.88 | 6.1 | — | — | Soluble |
| Illustration III | 1.0 | 2.20 | 0.84 | 6.2 | — | — | Soluble |
| Illustration IV | 1.1 | 2.30 | 0.85 | 7.1 | — | — | Soluble |
| Illustration V | 1.2 | 2.40 | 0.83 | 9.2 | — | — | soluble |

The products of Examples XVI – XXXIV are all shown to be highly absorbent and therefore suitable for use in absorbent structures, while the products of Illustrations I – V illustrate that the products of this invention are not produced in the absence of a molar excess of neutralized monochloroacetic acid over remaining moles of sodium hydroxide.

ILLUSTRATION VI

Eighty grams of sheeted cellulose pulp were disintegrated in an aqueous isopropanol solution with vigorous agitation and 65.9 grams of sodium hydroxide, per se, was added in an aqueous solution having a concentration of 50 percent by weight. The amount of isopropanol and water was adjusted so that the total diluent to cellulose ratio by weight, including the water accompanying the sodium hydroxide, was 25 to 1, while the water to cellulose ratio, by weight, was 2.8 to 1; consequently, the alcohol to water ratio was 8 to 1. After reacting 1 hour at 20°-25C., 103.2 grams of monochloroacetic acid was added to the slurry while agitation was continued.

At this time the sodium hydroxide present was in the ratio of 1.5 moles per mole of monochloroacetic acid, and the monochloroacetic acid present was in the ratio of 2.2 moles per mole of cellulose. The temperature of the reaction vessel was increased to 55°C. and the reaction allowed to proceed for 3.5 hours. At this time the product was filtered and purified by washing with methanol and air dried. The product had a d.s. of 0.69, a pH of 5.4 and a reflectance brightness as measured by the Beckman Du Spectrophotometer of 75 at a wavelength of 457 mmu. The product was soluble, not substantially insoluble as are the products of the present invention, and formed clear solutions. Illustrative samples of the product were heat treated at 160°C. for various times, to illustrate conventional curing methods, and the product became insoluble but discolored. This illustration product properties were as follows:

| Time of 160°C. heat treatment (hrs.) | SRV | WRV | % Sol. | Reflectance |
|---|---|---|---|---|
| 1.0 | 1435 | 5319 | 29.3 | 65 |
| 1.5 | 1146 | 9440 | 34.7 | 67 |
| 2.0 | 773 | 2405 | 14.9 | 58 |
| 2.5 | 756 | 1122 | 13.6 | 54 |
| 3.0 | 620 | 715 | 7.3 | 53 |

As a comparison the reflectance brightness of Example II products was higher than the products of Illustration VI at a given degree of insolubilization engendered in the etherification reaction.

EXAMPLE XXXV

Eighty grams of comminuted cellulose was slurried in an aqueous isopropanol mixture with vigorous agitation and 65.9 grams of sodium hydroxide, per se, was added in an aqueous solution having a concentration of 50 percent by weight. The amount of isopropanol and water were adjusted so that the total diluent/cellulose ratio by weight, including the water accompanying the sodium hydroxide, was 30 to 1 while the water/cellulose ratio, by weight, was 3.33 to 1; consequently, the alcohol to water ratio was 8 to 1. After continuing the contacting of the slurried cellulose with the sodium hydroxide for 30 minutes at 20°-25°C., 103.2 grams of monochloroacetic acid were added while agitation was continued. At this time the sodium hydroxide present was in the ratio of 1.5 moles per mole of monochloroacetic acid, and the monochloroacetic acid present was in the ratio of 2.2 moles per mole of cellulose. The temperature of the reaction vessel was increased to 80°C. and the reaction allowed to proceed. At the end of the reaction period of 5 hours, the product was filtered and purified by washing with methanol and air dried. The product had the following properties:

| d.s. | pH | SRV | WRV | % Sol. |
|---|---|---|---|---|
| .87 | 6.7 | 960 | 1543 | 9.8 |

The product of this Example XXXV is shown to be substantially insoluble, highly absorbent and retentive of aqueous solutions.

EXAMPLE XXXVI

The quantities of reactants were in the same ratio as in Example XXXV, except that the diluent to cellulose ratio was 16.5 to 1 and the water to cellulose ratio was 1.85 to 1.

| d.s. | pH | SRV | WRV | % Sol. |
|---|---|---|---|---|
| .90 | 6.4 | 797 | 1094 | 10.7 |

The product of this Example XXXVI is a substantially insoluble, highly absorbent material suitable for use in absorbent structures.

EXAMPLE XXXVII

The quantities of pulp, water, alkali and monochloroacetic acid were the same as in Examples I – III, except that isobutanol was substituted for isopropanol. The reaction at 80°C. and 5 hours yielded a product with the following properties:

| d.s. | pH | SRV | WRV | % Sol. |
|---|---|---|---|---|
| .55 | 5.9 | 789 | 2971 | 15.3 |

The product of this Example XXXVII is highly absorbent and suitable for use in absorptive structures of a personal use nature.

The data presented in the above Examples and Illustrations shows the advantage of the present process in producing carboxymethyl cellulose products of substantial insolubility which have enhanced absorptive and retentive properties at conventionally soluble d.s.'s. The process and the products produced thereby have additional advantage in that they are produced in one continuing process sequence without the necessity of post curing steps as would be conventionally conducted in a relatively expensive oven apparatus. In addition, the carboxymethyl cellulose products of this invention show an improved whiteness or reflectance brightness value which is of importance and attractiveness where the products are to be used in products and structures of a personal use nature.

While specific examples of processes embodying the present invention have been described above, it will be apparent that many changes and modifications may be made in the methods of procedure without departure from the spirit of the invention. It would be understood, therefore, that the examples cited and the procedures set forth herein are intended to be illustrative only and are not intended to limit the invention further than that required by the appended claims.

Having thus described the invention, what is claimed is:

1. In a slurry process for the production of alkali metal salts of carboxymethyl cellulose, exhibiting increased absorptive and retentive capacity, wherein cellulose is slurried in an aqueous solution of an inert organic diluent and contacted in a first step with a water soluble alkali metal hydroxide and the resulting alkali cellulose is contacted with a carboxyl group containing etherifying reagent in a second step and thereby etherified to a conventionally soluble d.s. while still slurried in said aqueous solution of inert diluent; the improvement which consists of maintaining a total liquid to cellulose ratio in said steps of about 15 to about 40 to 1, by weight, while contacting the cellulose and the alkali cellulose in said steps with about 1.1 to about 1.9 moles of a water soluble alkali metal hydroxide per mole of carboxyl group containing etherifying reagent and using about 0.4 moles to about 8 moles of carboxyl group containing etherifying reagent per mole of anhydroglucose unit of cellulose, while maintaining a mole ratio of water soluble alkali metal hydroxide to anhydroglucose unit of cellulose after neutralization of at least 0.5, to produce an essentially acid product while further maintaining as liquid ratios in said steps, a water to cellulose ratio of about 3 to about 7 to 1, by weight, and an inert organic diluent to water ratio of about 4 to about 10 to 1, by weight, while contacting the slurried cellulose with the water soluble alkali metal hydroxide at a slurry temperature of about 0°C. to about 30°C. for a period of about 0.1 to about 1 hour and thereafter contacting the thus produced alkali cellulose with the carboxyl group containing etherifying reagent at a slurry temperature of about 60°C. to about 80°C. for a period of about 3 hours to about 24 hours to produce alkali metal salts of carboxymethyl cellulose exhibiting a d.s. of about 0.4 to about 1.2, a water solubility of less than about 35 percent, a WRV of about 1,000 to about 7,000 and a SRV of about 400 to about 2500.

2. In a slurry process for the production of sodium carboxymethyl cellulose, exhibiting increased absorptive and retentive capacity wherein cellulose is slurried in an aqueous solution of isopropanol and contacted in a first step with sodium hydroxide and the resulting alkali cellulose is contacted with monochloroacetic acid in a second step and thereby etherified to a conventionally soluble d.s. while still slurried in said aqueous solution of isopropanol; the improvement which consists of maintaining a total liquid to cellulose ratio in said steps of about 25 to 40 to 1, by weight, while contacting the cellulose and the alkali cellulose in said steps with about 1.5 moles of sodium hydroxide per mole of monochloroacetic acid and using about 2.2 moles of monochloroacetic acid per mole of anhydroglucose unit of cellulose after neutralization of at least 0.5, to produce an essentially acid product while further maintaining as liquid ratios in said steps, a water to cellulose ratio of about 3.3 to 1, by weight, and an isopropanol to water ratio of about 8 to 1, by weight, while contacting the slurried cellulose with the sodium hydroxide at a slurry temperature of about 5°C. to about 25°C. for a period of about 0.2 to about 0.6 hour and thereafter contacting the thus produced alkali cellulose with the monochloroacetic acid at a slurry temperature of about 60°C. to about 80°C. for a period of about 3 hours to about 12 hours to produce sodium carboxymethyl cellulose exhibiting a d.s. of about 0.4 to about 1.2, a water solubility of less than about 35 percent, a WRV of about 1000 to about 7000 and a SRV of about 400 to about 2,500 is produced.

3. In a slurry process for the production of sodium carboxymethyl cellulose, exhibiting increased absorptive and retentive capacity wherein cellulose is slurried in an aqueous solution of isopropanol and contacted in a first step with sodium hydroxide and the resulting alkali cellulose is contacted with monochloroacetic acid and thereby etherified to a conventionally soluble d.s. while still slurried in said aqueous solution of isopropanol; the improvement which consists of maintaining a total liquid to cellulose ratio in said steps of about 30 to 1, by weight, while contacting the cellulose and the alkali cellulose in said steps with about 1.5 moles of sodium hydroxide per mole of monochloroacetic acid and using about 2.2 moles of monochloroacetic acid per mole of anhydroglucose unit of cellulose, while maintaining a mole ratio of sodium hydroxide to anhydroglucose unit of cellulose after neutralization of at least 0.5, to produce an essentially acid product while further maintaining as liquid ratios in said steps, a water to cellulose ratio of about 3.3 to 1, by weight, and an isopropanol to water ratio of about 8 to 1, by weight, while contacting the slurried cellulose with the sodium hydroxide at a slurry temperature of about 20°C. for a period of about 0.5 hour and thereafter contacting the thus produced alkali cellulose with the monochloroacetic acid at a slurry temperature of about 80°C. for a period of about 3 hours, to produce sodium carboxymethyl cellulose exhibiting a d.s. of about 0.4 to about 1.2, a water solubility of less than about 35%, a WRV of about 1000 to about 7000 and a SRV of about 400 to about 2500 is produced.

4. An essentially acidic sodium carboxymethyl cellulose having a d.s. of about 0.4 to about 1.2 and exhibiting a WRV of about 1,000 to about 7000 together with a SRV of about 400 to about 2,500, which sodium carboxymethyl cellulose is further characterized by having a reflectance brightness of about 70 to about 80 like the reflectance brightness exhibited by conventional slurry sodium carboxymethyl cellulose products.

5. An essentially acidic sodium carboxymethyl cellulose having a d.s. of about 0.7 to about 0.9 and exhibiting a WRV of about 2000 to about 4000 together with a SRV of about 1,000 to about 1,500, which sodium carboxymethyl cellulose is further characterized by having a reflectance brightness of about 70 to about 80 like the reflectance brightness exhibited by conventional slurry sodium carboxymethyl cellulose products.

6. An essentially acidic sodium carboxymethyl cellulose having a d.s. of about 0.8 and exhibiting a WRV of about 3,000 together with a SRV of about 1,300, which sodium carboxymethyl cellulose is further characterized by having a reflectance brightness of about 70 to about 80 like the reflectance brightness exhibited by conventional slurry sodium carboxymethyl cellulose products.

* * * * *